US011654670B2

(12) United States Patent
Kim et al.

(10) Patent No.: US 11,654,670 B2
(45) Date of Patent: May 23, 2023

(54) LAMINATION APPARATUS AND METHOD FOR MANUFACTURING DISPLAY DEVICE

(71) Applicant: Samsung Display Co., LTD., Yongin-si (KR)

(72) Inventors: Youngkwan Kim, Seoul (KR); Sanggil Kwak, Cheonan-si (KR); Hyungjun Lim, Asan-si (KR); Daehyun Kim, Suwon-si (KR); Heesun Ahn, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 236 days.

(21) Appl. No.: 17/135,200

(22) Filed: Dec. 28, 2020

(65) Prior Publication Data

US 2021/0323293 A1 Oct. 21, 2021

(30) Foreign Application Priority Data

Apr. 20, 2020 (KR) .................. 10-2020-0047568
Apr. 29, 2020 (KR) .................. 10-2020-0052781

(51) Int. Cl.
*B32B 37/10* (2006.01)
*B32B 37/00* (2006.01)
*G02B 1/14* (2015.01)

(52) U.S. Cl.
CPC ...... *B32B 37/1036* (2013.01); *B32B 37/0046* (2013.01); *B32B 2457/20* (2013.01); *G02B 1/14* (2015.01)

(58) Field of Classification Search
CPC ............ B32B 37/1036; B32B 37/0046; B32B 2457/20; B32B 38/1866; B32B 37/10; G02B 1/14
See application file for complete search history.

(56) References Cited

U.S. PATENT DOCUMENTS

| 2017/0129165 A1* | 5/2017 | Lee ..................... B32B 38/1841 |
| 2018/0056638 A1* | 3/2018 | Choi .................. H01L 27/1262 |
| 2018/0134022 A1 | 5/2018 | Kim et al. |
| 2020/0130340 A1 | 4/2020 | Choi et al. |
| 2020/0203672 A1* | 6/2020 | Kuon .................... G06F 1/1652 |

FOREIGN PATENT DOCUMENTS

| KR | 10-1653597 | 9/2016 |
| KR | 10-2018-0025429 | 3/2018 |
| KR | 10-2018-0056004 | 5/2018 |
| KR | 10-2018-0089609 | 8/2018 |
| KR | 10-2020-0008932 | 1/2020 |

* cited by examiner

*Primary Examiner* — Cynthia L Schaller
(74) *Attorney, Agent, or Firm* — H.C. Park & Associates, PLC

(57) ABSTRACT

A lamination apparatus including a jig and a pad disposed facing the jig. The jig may include an accommodation groove, which is defined by a bottom surface, a first side surface bent and extending from the bottom surface, and a second side surface bent and extending from the bottom surface. The pad includes a pressing surface facing the bottom surface, a first pad side surface bent from the pressing surface in a direction away from the jig, a second pad side surface bent from the pressing surface in a direction away from the jig, a connection surface connecting the first pad side surface to the second pad side surface, and a recess recessed from the pressing surface, the connection surface, and the first pad side surface.

20 Claims, 19 Drawing Sheets

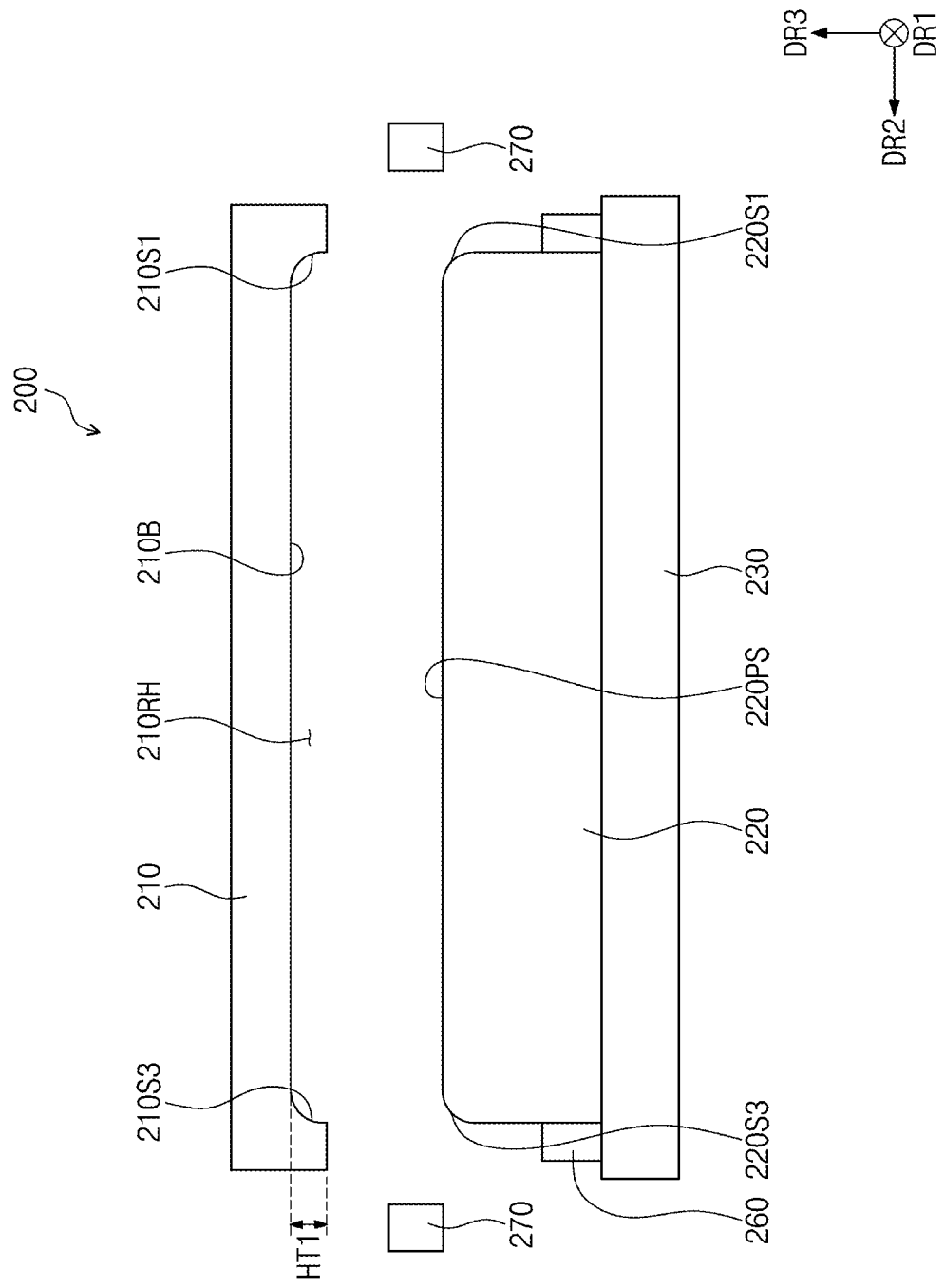

LAMINATION APPARATUS AND METHOD FOR MANUFACTURING DISPLAY DEVICE

CROSS-REFERENCE TO RELATED APPLICATIONS

This application claims priority from and the benefit of Korean Patent Application No. 10-2020-0047568, filed on Apr. 20, 2020, and Korean Patent Application No. 10-2020-0052781, filed on Apr. 29, 2020, which are hereby incorporated by reference for all purposes as if fully set forth herein.

BACKGROUND

Field

Exemplary embodiments of the present invention relate to a lamination apparatus, which provides an improved lamination process yield, and a method for manufacturing a display device using same.

Discussion of the Background

Display devices may include a window and a display panel. The window may be provided to protect the display panel, and the window and the display panel may be attached to each other by an adhesive layer. A lamination apparatus may be used to laminate the window and the display panel.

The above information disclosed in this Background section is only for understanding of the background of the inventive concepts, and, therefore, it may contain information that does not constitute prior art.

SUMMARY

An exemplary embodiment of the present invention provides a lamination apparatus, which exhibits an improved manufacturing yield, and a method for manufacturing a display device.

Additional features of the inventive concepts will be set forth in the description which follows, and in part will be apparent from the description, or may be learned by practice of the inventive concepts.

An exemplary embodiment of the inventive concept provides a lamination apparatus including: a jig including an accommodation groove which is defined by a bottom surface, a first side surface bent and extending from the bottom surface, and a second side surface bent and extending from the bottom surface; and a pad facing the jig. The pad includes a pressing surface facing the bottom surface, a first pad side surface bent from the pressing surface in a direction away from the jig, a second pad side surface bent from the pressing surface in a direction away from the jig, a connection surface connecting the first pad side surface to the second pad side surface, and a recess recessed from the pressing surface, the connection surface, and the first pad side surface.

The first side surface and the first pad side surface may extend in a first direction, and the second side surface and the second pad side surface may extend in a second direction crossing the first direction.

When viewed in a thickness direction of the pad, a width of the recess in the first direction may be greater than a width of the recess in the second direction.

A length of the first side surface in the first direction may be less than a length of the second side surface in the second direction.

A height of the first side surface may be less than a height of the second side surface.

The lamination apparatus may further include a shape control part disposed adjacent to the first pad side surface of the pad, wherein the shape control part has a shape extending in the first direction.

The shape control part may be more rigid than the pad.

The recess may include a recess bottom surface, a first recess side surface connected to the recess bottom surface and the pressing surface, and a second recess side surface connected to the recess bottom surface and the first pad side surface, wherein a portion facing the first recess side surface and a portion facing the second recess side surface in the recess are opened.

The recess may include a first recess and a second recess, wherein the first recess and the second recess are recessed from the pressing surface and the first pad side surface, and the first recess and the second recess are spaced apart from each other in the first direction with the first pad side surface therebetween.

The first recess and the second recess may have shapes symmetric to each other with respect to a symmetry line extending in the second direction.

A sum of a distance between the first recess and the second recess, a width of the first recess in the first direction, and a width of the second recess in the first direction may be equal to or greater than a width of the pressing surface in the first direction.

Another exemplary embodiment of the inventive concept provides a method for manufacturing a display device including: fixing a window to a jig which has an accommodation groove; fixing to a clamp a display panel which includes a first portion having a first width parallel to a first direction and a second portion having a second width less than the first width and parallel to the first direction; and pressing the first portion of the display panel toward the window by using a pad which includes a pressing surface, a first pad side surface bent from the pressing surface in a direction away from the jig, a second pad side surface bent from the pressing surface in a direction away from the jig, and a recess recessed from the pressing surface and the first pad side surface, wherein the display panel is aligned so that the recess of the pad is adjacent to a boundary between the first portion and the second portion.

The method may further include: bending the display panel with respect to the first direction by using the clamp; bringing the first portion of the display panel into contact with the pad, after the bending of the display panel; and bending the first portion of the display panel with respect to a second direction crossing the first direction, after the bringing of the display panel into contact with the pad.

The window may include a main transmission surface and side transmission surfaces bent and extending from the main transmission surface, and the first portion of the display panel may be attached to the main transmission surface and the side transmission surfaces.

A length of the boundary between the first portion and the second portion may be greater than a length of the first pad side surface in the first direction.

The recess may include a recess bottom surface, a first recess side surface connected to the recess bottom surface and the pressing surface, and a second recess side surface connected to the recess bottom surface and the first pad side surface, wherein a portion facing the first recess side surface and a portion facing the second recess side surface in the recess are opened.

A width of the pressing surface in the first direction may be greater than a length of the first pad side surface in the first direction.

Another exemplary embodiment of the inventive concept provides a lamination apparatus including: a jig including an accommodation groove which is defined by a bottom surface and first, second, third, and fourth side surfaces that are bent and extend from the bottom surface; and a pad including a pressing surface, which faces the bottom surface, and first, second, third, and fourth pad side surfaces that extend from the pressing surface, wherein a recess is defined in a portion in which the first pad side surface and the pressing surface of the pad meet each other, and the first pad side surface has a predetermined curvature.

The recess may include a first recess and a second recess, wherein the first recess and the second recess are spaced apart from each other in a first direction with the first pad side surface therebetween.

The recess may include a recess bottom surface, a first recess side surface connected to the recess bottom surface and the pressing surface, and a second recess side surface connected to the recess bottom surface and the first pad side surface, wherein a portion facing the first recess side surface and a portion facing the second recess side surface in the recess are opened.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5B is a cross-sectional view of a lamination apparatus according to an embodiment of the inventive concept.

DETAILED DESCRIPTION

Figure 1:
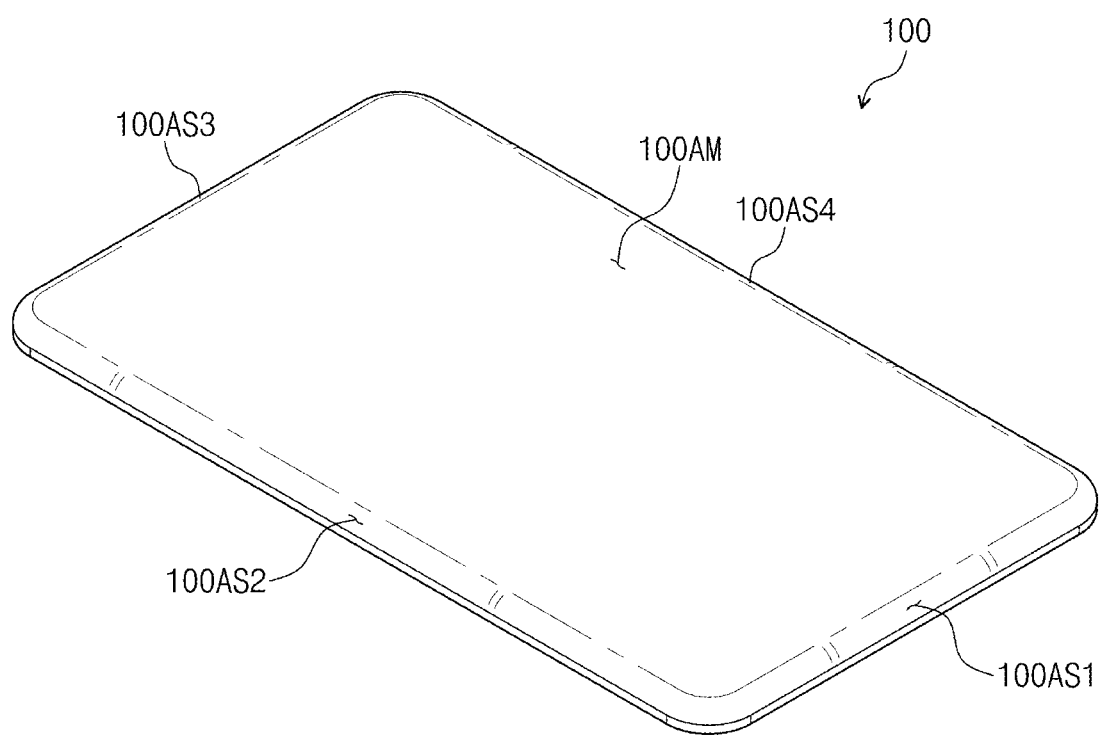
FIG. 1 is a perspective view of a display device according to an embodiment of the inventive concept.
Figure 1:
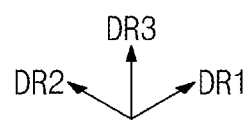

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional is and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless s expressly so defined herein.

The term "and/or" includes any and all combinations of one or more of the associated listed items.

Hereinafter, embodiments of the inventive concept will be described with reference to the accompanying drawings.

Figure 2A:
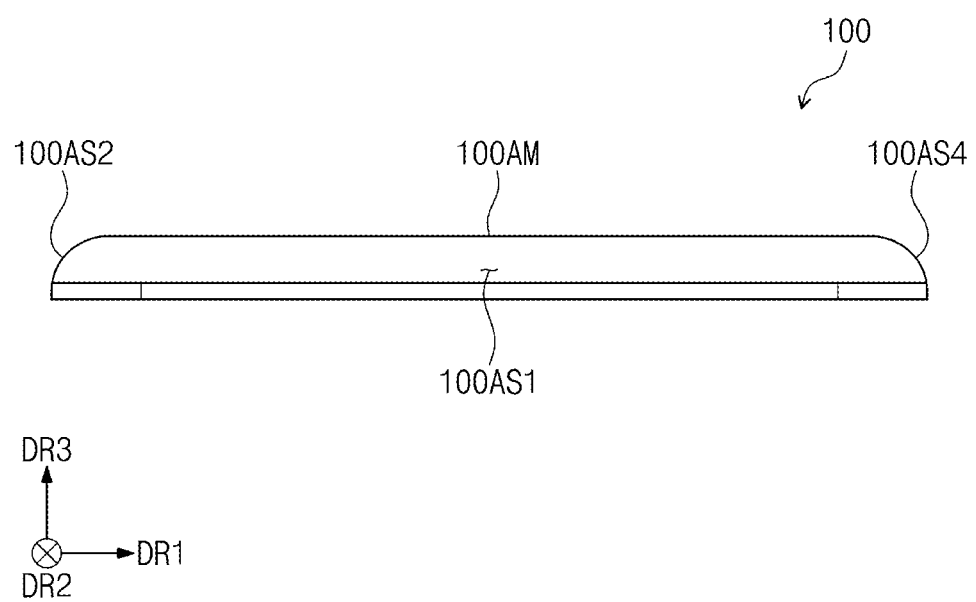
FIG. 2A is a cross-sectional view of a display device according to an embodiment of the inventive concept.
Figure 2B:
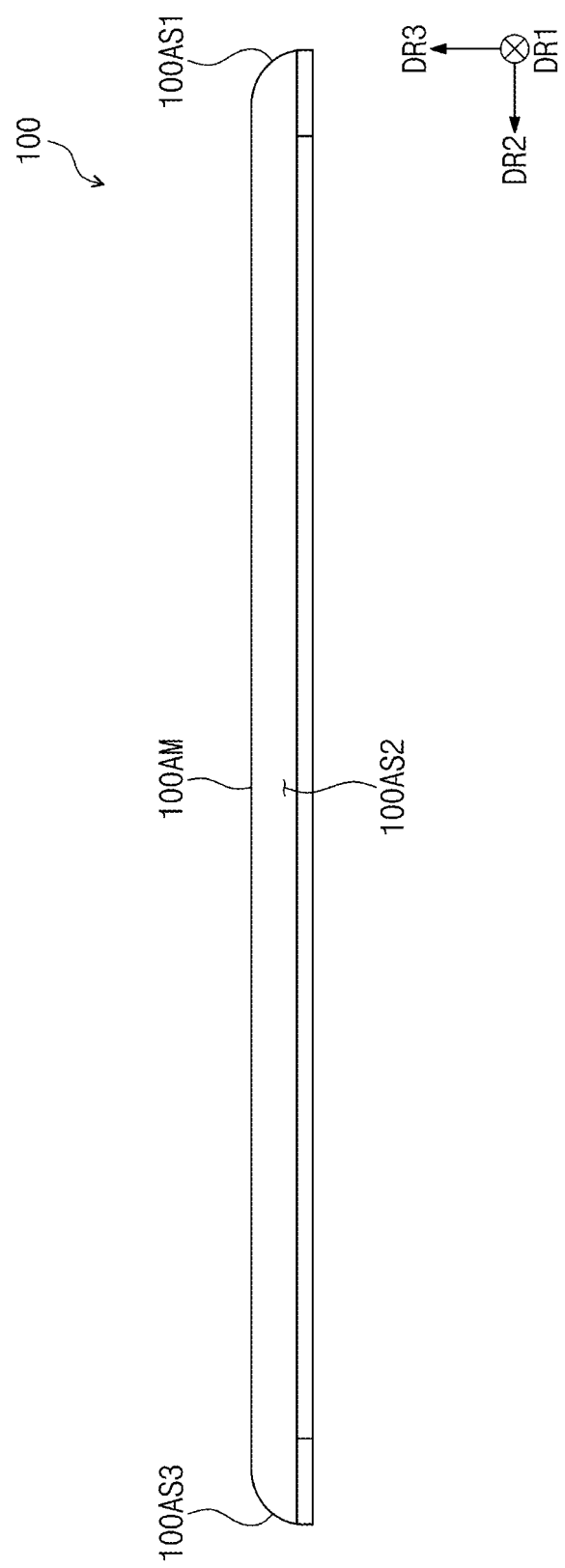
FIG. 2B is a cross-sectional view of a display device according to an embodiment of the inventive concept.

FIG. 1 is a perspective view of a display device according to an embodiment of the inventive concept. FIG. 2A is a cross-sectional view of the display device according to the embodiment of the inventive concept. FIG. 2B is a cross-sectional view of the display device according to the embodiment of the inventive concept.

Referring to FIGS. 1, 2A, and 2B, a display device 100 is a device activated in is response to an electrical signal. For example, the display device 100 may be a mobile phone, a tablet PC, a vehicle navigation unit, a game console, or a wearable device, but is not limited thereto. In FIG. 1, the display device 100 is illustratively shown as a mobile phone, for example.

In the display device 100, a display area may be defined. Through the display area, the display device 100 may display an image and receive an external input. The display area may include a main display area 100AM and first-to-fourth sub-display areas 100AS1, 100AS2, 100AS3, and 100AS4.

The main display area 100AM may be substantially parallel to a plane defined by a first direction DR1 and a second direction DR2. A third direction DR3 crossing both the first direction DR1 and the second direction DR2 may be defined as a thickness direction of the display device 100. Unlike in the drawing, the main display area 100AM may have a shape concavely or convexly curved with respect to the plane defined by the first direction DR1 and the second direction DR2.

The first-to-fourth sub-display areas 100AS1, 100AS2, 100AS3, and 100AS4 may be bent from the main display area 100AM. The main display area 100AM and the first-to-fourth sub-display areas 100AS1, 100AS2, 100AS3, and 100AS4 may be adjacent to each other to create the continuous display area. Each of the first-to-fourth sub-display areas 100AS1, 100AS2, 100AS3, and 100AS4 may be bent from the main display area 100AM and have a predetermined curvature. The curvatures of the first-to-fourth sub-display areas 100AS1, 100AS2, 100AS3, and 100AS4 may be equal to or different from each other.

The first sub-display area 100AS1 and the third sub-display area 100AS3 may extend in the first direction DR1 and be spaced apart from each other in the second direction DR2, with the main display area 100AM therebetween. The second sub-display area 100AS2 and the fourth sub-display area 100AS4 may extend in the second direction DR2 and be spaced apart from each other in the first direction DR1 with the main display area 100AM therebetween.

FIG. 1 illustratively shows that the display device 100 includes one main display area 100AM and four first-to-fourth sub-display areas 100AS1, 100AS2, 100AS3, and 100AS4, but the inventive concept is not limited thereto. For example, the display device 100 may include one main display area 100AM and only some of the first-to-fourth sub-display areas 100AS1, 100AS2, 100AS3, and 100AS4.

Figure 3:
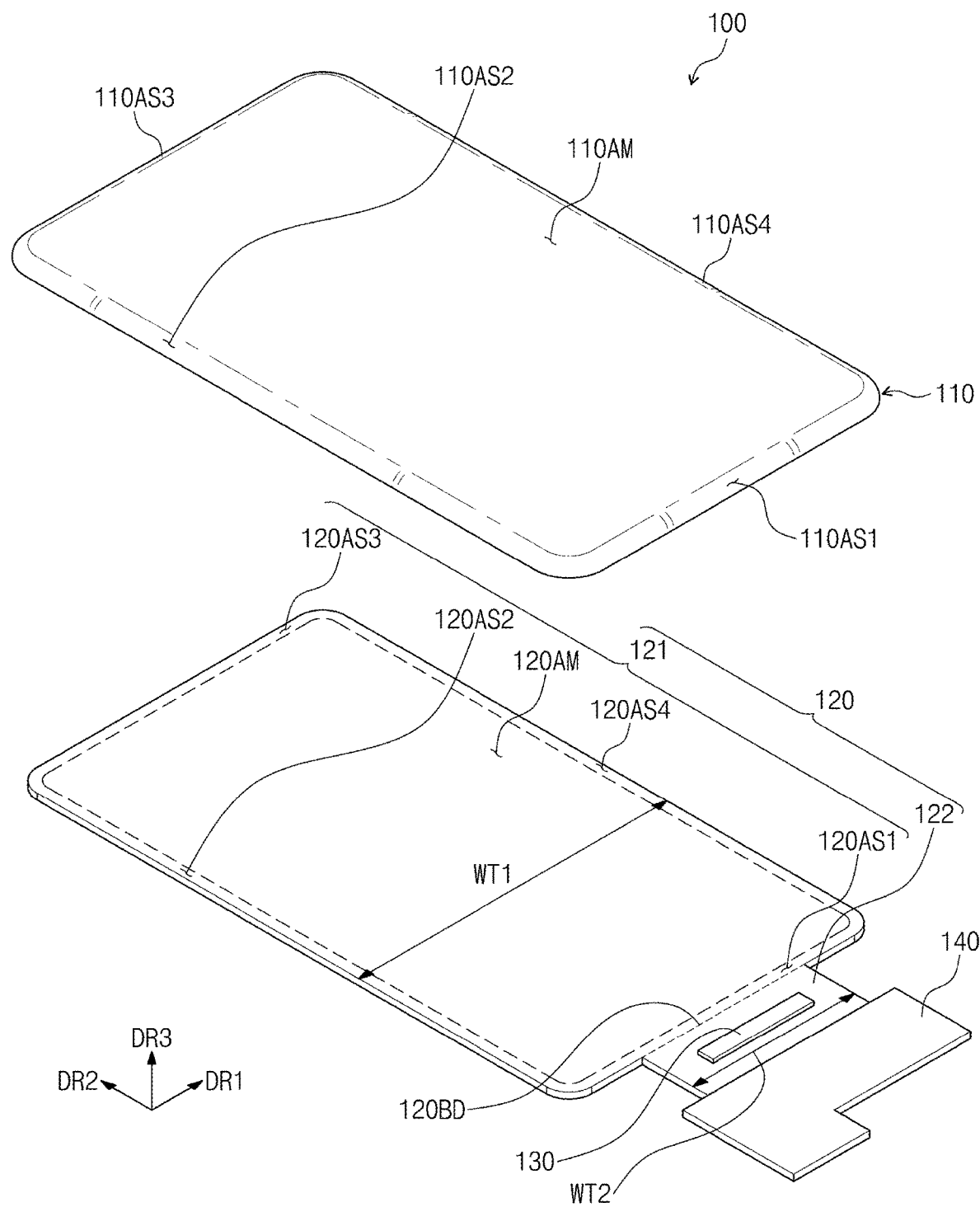
FIG. 3 is an exploded perspective view illustrating a partial configuration of a display device according to an embodiment of the inventive concept.

FIG. 3 is an exploded perspective view illustrating a partial configuration of a display device according to an embodiment of the inventive concept.

Referring to FIG. 3, a display device 100 may include a window 110, a display panel 120, a driving chip 130, and a main circuit board 140.

The window 110 may include an optically transparent insulating material, and the window 110 may include glass or plastic. The window 110 may include a multi-layered structure or a single-layered structure.

The window 110 may include a main transmission surface 110AM and first-to-fourth side transmission surfaces 110AS1, 110AS2, 110AS3, and 110AS4 that are bent and extend from the main transmission surface 110AM. Each of the first-to-fourth side transmission surfaces 110AS1, 110AS2, 110AS3, and 110AS4 may have a predetermined curvature. The curvatures of the first-to-fourth side transmission surfaces 110AS1, 110AS2, 110AS3, and 110AS4 may be equal to or different from each other. However, the inventive concept is not limited thereto, and each of the first-to-fourth side transmission surfaces 110AS1, 110AS2, 110AS3, and 110AS4 may be a flat surface.

The first side transmission surface 110AS1 and the third side transmission surface 110AS3 may extend in a first direction DR1 and be spaced apart from each other in a second direction DR2 with the main transmission surface 110AM therebetween. The second side transmission surface 110AS2 and the fourth side transmission surface 110AS4 may extend in the second direction DR2 and be spaced apart from each other in the first direction DR1, with the main transmission surface 110AM therebetween.

The display panel 120 may be disposed below the window 110 and attached to the window 110. The display panel 120 may be a substantive component for generating an image. The display panel 120 may be a light emitting display panel. For example, the display panel 120 may be an organic light emitting display panel, a quantum-dot light emitting display panel, a micro-LED display panel, or a nano-LED display panel.

The display panel 120 may include a first portion 121 and a second portion 122. The first portion 121 and the second portion 122 may be adjacent to each other in the second direction DR2. The second portion 122 may be a portion protruding and extending from the first portion 121 in the second direction DR2, and the first portion 121 and the second portion 122 may have a continuous shape (or an integrated shape). A width WT1 of the first portion 121 in the first direction DR1 may be greater than a width WT2 of the second portion 122 in the first direction DR1. A length of a boundary 120BD between the first portion 121 and the second portion 122 may be less than the width WT1 of the first portion 121.

The first portion 121 of the display panel 120 may include a main display area 120AM and first-to-fourth side display areas 120AS1, 120AS2, 120AS3, and 120AS4. The main display area 120AM and the first-to-fourth side display areas 120AS1, 120AS2, 120AS3, and 120AS4 may provide an image toward the window 110. Although not illustrated, the display panel 120 may further include a non-display area defined to surround the main display area 120AM and the first-to-fourth side display areas 120AS1, 120AS2, 120AS3, and 120AS4.

The window 110 may be attached to the first portion 121 of the display panel 120. That is, the first portion 121 may be attached to the main transmission surface 110AM and the first-to-fourth side transmission surfaces 110AS1, 110AS2, 110AS3, and 110AS4. For example, the main display area 120AM may be attached to the main transmission surface 110AM, and the first-to-fourth side display areas 120AS1, 120AS2, 120AS3, and 120AS4 may be attached to the first-to-fourth side transmission surfaces 110AS1, 110AS2, 110AS3, and 110AS4, respectively.

The second portion 122, which is not attached to the window 110, may be bent toward a bottom surface of the first portion 121. The driving chip 130 may be mounted to the second portion 122, and the main circuit board 140 may be attached thereto. The driving chip 130 may include a chip-type timing control circuit. However, this is merely an example, and the driving chip 130 may be mounted on a film separate from the display panel 120. In this case, the driving chip 130 may be electrically connected to the display panel 120 via the film.

Figure 4:
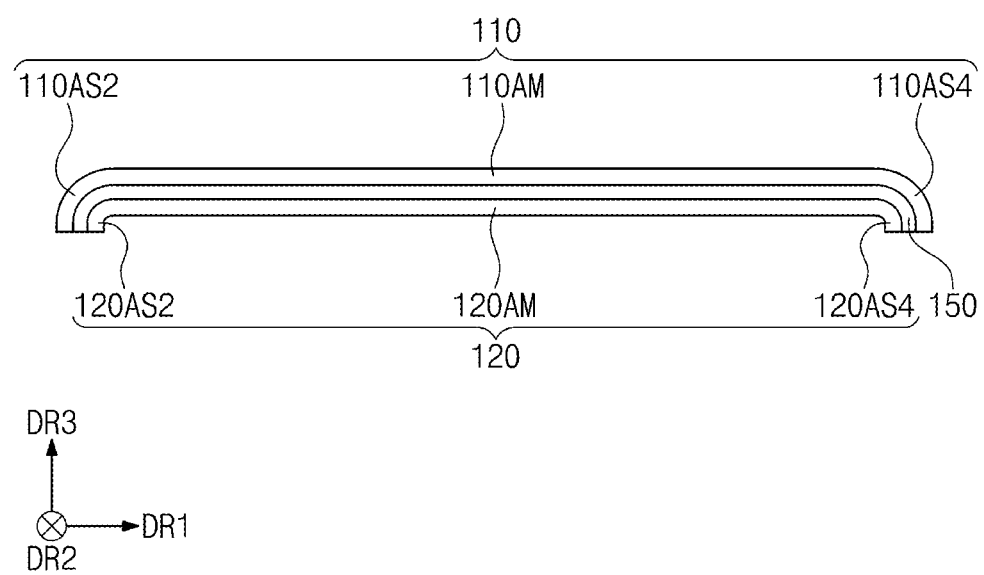
FIG. 4 is a cross-sectional view illustrating a partial configuration of a display device according to an embodiment of the inventive concept.

FIG. 4 is a cross-sectional view illustrating a partial configuration of a display device according to an embodiment of the inventive concept.

FIG. 4 illustrates a state in which a window 110 and a display panel 120 are attached to each other by an adhesive layer 150. The adhesive layer 150 may include a general adhesive or bonding agent. For example, the adhesive layer 150 may be a pressure sensitive adhesive film (PSA) or a transparent adhesive member such as an optically clear adhesive film (OCA) or an optically clear resin (OCR).

Figure 5A:
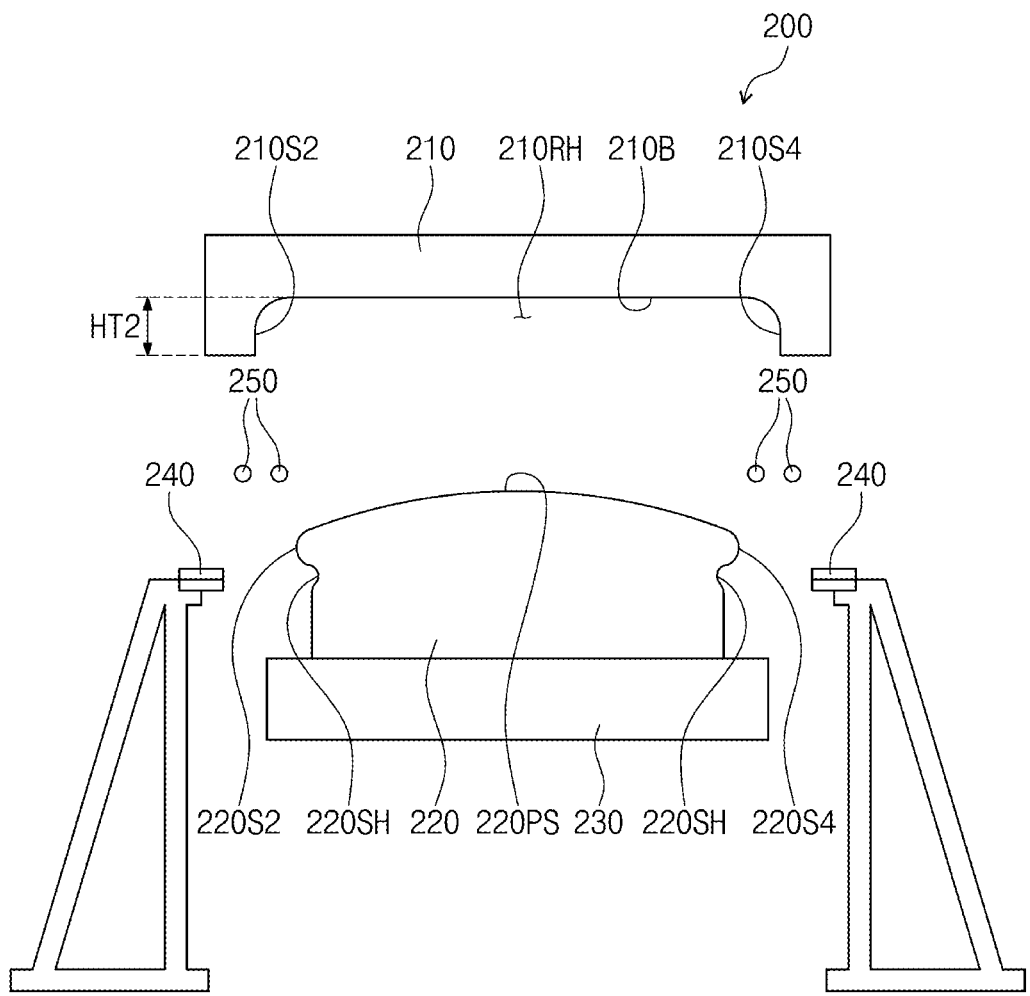
FIG. 5A is a cross-sectional view of a lamination apparatus according to an embodiment of the inventive concept.

FIG. 5A is a cross-sectional view of a lamination apparatus according to an embodiment of the inventive concept. FIG. 5B is a cross-sectional view of the lamination is apparatus according to the embodiment of the inventive concept.

FIGS. 5A and 5B are the cross-sectional views illustrating the same lamination apparatus 200. FIG. 5A is a view illustrating a cross-section of the lamination apparatus 200 parallel to a plane defined by a first direction DR1 and a third direction DR3, and FIG. 5B is a view illustrating a cross-section of the lamination apparatus 200 parallel to a plane defined by a second direction DR2 and the third direction DR3.

Referring to FIGS. 5A and 5B, the lamination apparatus 200 may include a jig 210 (or an upper jig), a pad 220 (or a pressing pad), a lower jig 230, a clamp 240, a first pressing part 250, a shape control part 260, and a second pressing part 270.

The jig 210 may include a bottom surface 210B and first-to-fourth side surfaces 210S1, 210S2, 210S3, and 210S4 that are bent and extend from the bottom surface 210B. The jig 210 may include an accommodation groove 210RH that is defined by the bottom surface 210B and the first-to-fourth side surfaces 210S1, 210S2, 210S3, and 210S4. The window 110 (see FIG. 4) may be fixed to the accommodation groove 210RH.

Heights of the first-to-fourth side surfaces 210S1, 210S2, 210S3, and 210S4 of the jig 210 may not be equal to each other. For example, the first side surface 210S1 and the third side surface 210S3 may have the same first height HT1, and the second side surface 210S2 and the fourth side surface 210S4 may have the same second height HT2. The first height HT1 may be less than the second height HT2. The first height HT1 may represent a height of a jig side wall including the first side surface 210S1, and the second height HT2 may represent a height of a jig side wall including the second side surface 210S2.

The first height HT1 may correspond to a depth of a portion of the bottom surface 210B adjacent to the first side surface 210S1, and the first height HT2 may correspond to a depth of another portion of the bottom surface 210B adjacent to the second side surface 210S2.

The pad 220 may be disposed below the jig 210. The pad 220 may be made of an elastic material. For example, the pad 220 may include a material having a shape which is easily deformable due to pressure, but is not particularly limited thereto. For example, the pad 220 may include silicone.

The pad 220 may include a pressing surface 220PS and first-to-fourth pad side surfaces 220S1, 220S2, 220S3, and 220S4 that are bent and extend from the pressing surface 220PS. A side surface groove 220SH may be defined in a portion adjacent to each of the second pad side surface 220S2 and the fourth pad side surface 220S4 of the pad 220. The side surface groove 220SH may be a portion for holding a carrier film 300 (see FIG. 10A) to which the display panel 120 (see FIG. 4) is attached. In the embodiment of the inventive concept, the side surface groove 220SH may be omitted. Alternatively, the side surface groove 220SH may be further provided in at least one of a portion adjacent to the first pad side surface 220S1 and a portion adjacent to the third pad side surface 220S3.

The lower jig 230 may be disposed below the pad 220. The lower jig 230 may move the pad 220 in a direction toward the jig 210 or move the pad 220 in a direction away from the jig 210. For example, the lower jig 230 and the pad 220 may be moved in a direction parallel to the third direction DR3.

Clamps 240 may be disposed spaced apart from each other in the first direction DR1. The carrier film 300 (see FIG. 10A) to which the display panel 120 (see FIG. 3) is attached may be clamped by the clamps 240. The clamps 240 may be modified into other components. For example, the clamps 240 may be replaced with insertion portions in which predetermined grooves are defined. The clamps 240 may be moved in directions approaching each other or in directions away from each other. For example, each of the clamps 240 may be moved in a direction parallel to the first direction DR1.

The first pressing part 250 may have a bar shape extending in the second direction DR2. The first pressing part 250 may play a role in holding the carrier film 300 (see FIG. 10A) which is in contact with the pad 220, and thus, the carrier film 300 is brought into close contact with the pad 220. For example, the first pressing part 250 may have a shape conforming to the side surface groove 220SH.

The shape control part 260 may be disposed above the lower jig 230 and adjacent to the pad 220. For example, the shape control part 260 may be provided in plurality and disposed spaced apart from each other with the pad 220 therebetween. For example, the shape control parts 260 may be disposed spaced apart from each other in the second direction DR2. The shape control parts 260 may be disposed adjacent to the first pad side surface 220S1 and the third pad side surface 220S3. Each of the shape control parts 260 may extend in the first direction DR1.

The shape control parts 260 may be disposed facing the side surfaces, having relatively lower heights, of the first-to-fourth side surfaces 210S1, 210S2, 210S3, and 210S4 of the jig 210. For example, the shape control parts 260 may be disposed in a region facing the first side surface 210S1 and in a region facing the third side surface 210S3.

The shape control parts 260 may play a role in controlling a shape of the pad 220 while the pad 220 presses the jig 210. The shape control parts 260 may be rigid. For example, the shape control parts 260 may be made of plastic.

When the pad 220 presses the jig 210, the second side surface 210S2, the fourth side surface 210S4, and the shape control parts 260 may prevent the pad 220 from protruding outside before the pad 220 sufficiently presses the accommodation groove 210RH of the jig 210. Thus, when two objects are laminated using the pad 220, a possibility of the occurrence of bubbles between the two objects may be reduced, and a lamination process yield may be improved.

Figure 10A:
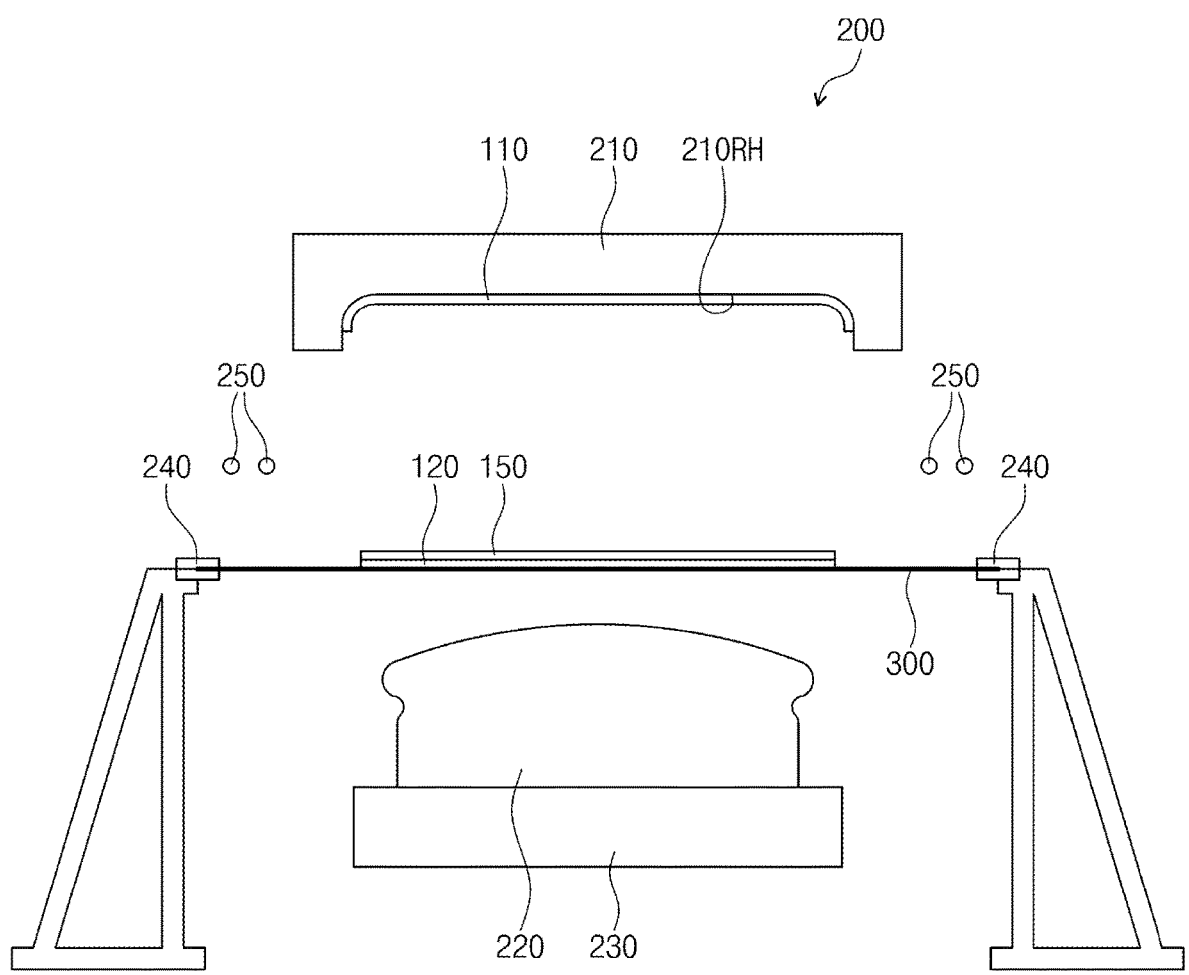
FIG. 10A, FIG. 10B, FIG. 10C, and FIG. 10D are views illustrating a method for manufacturing a display device according to an embodiment of the inventive concept.

The second pressing part 270 may be a component provided to deform a shape of the carrier film 300 (see FIG. 10A). The second pressing part 270 may be configured to move in a direction parallel to the second direction DR2. The second pressing part 270 may be omitted.

Figure 6:
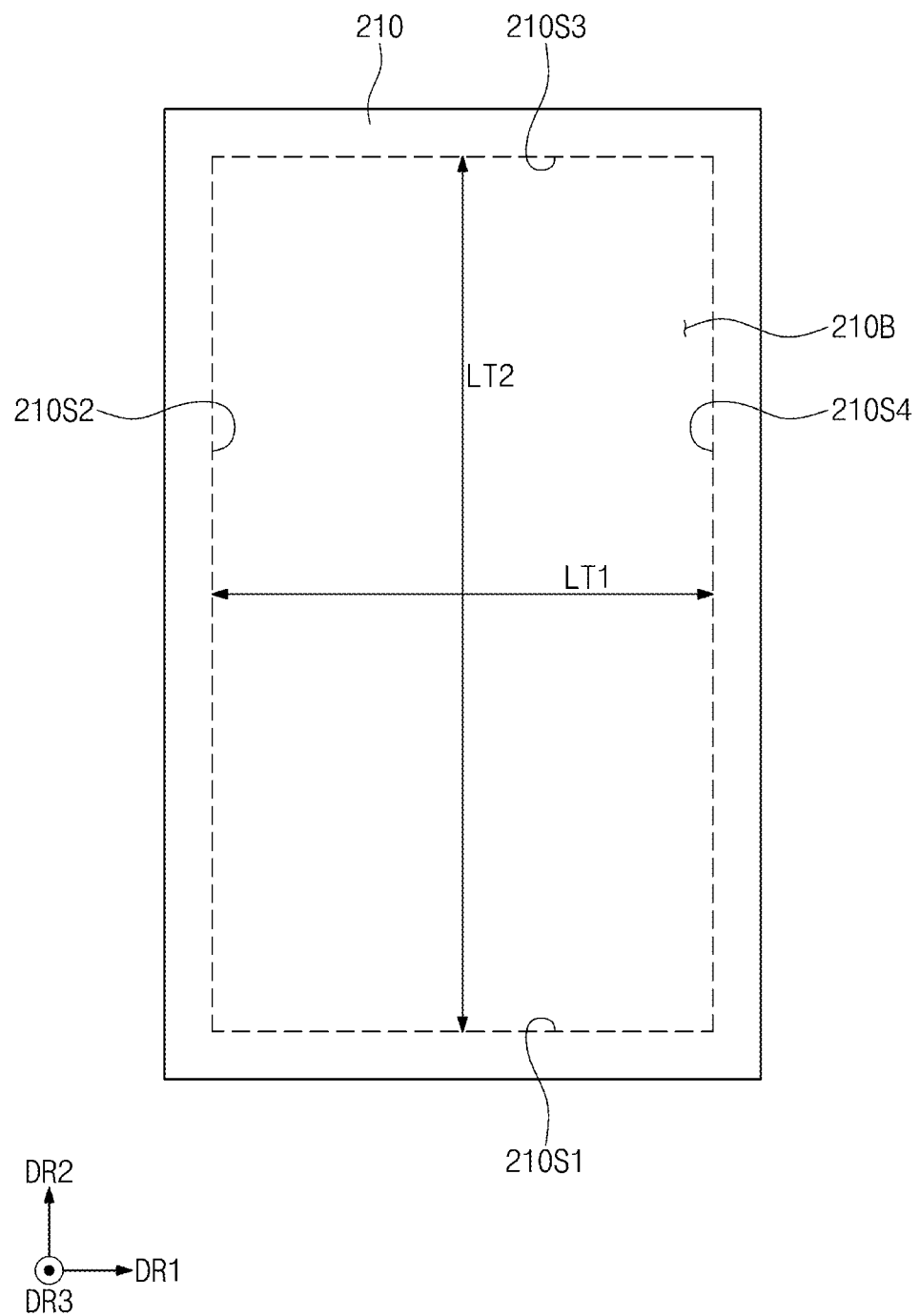
FIG. 6 is a plan view illustrating a jig according to an embodiment of the inventive concept.

FIG. 6 is a plan view illustrating a jig according to an embodiment of the inventive concept.

Referring to FIG. 6, it is illustrated that the accommodation groove 210RH (see FIG. 5A) of the jig 210 is defined by a bottom surface 210B and first-to-fourth side surfaces 210S1, 210S2, 210S3, and 210S4.

The first side surface 210S1 and the third side surface 210S3 may extend in a first direction DR1 and be spaced apart from each other in a second direction DR2. The second side surface 210S2 and the fourth side surface 210S4 may extend in the second direction DR2 and be spaced apart from each other in the first direction DR1.

A length LT1 of the first side surface 210S1 may be less than a length LT2 of the second side surface 210S2. However, this is merely illustrated as an example. The length LT1 of the first side surface 210S1 and the length LT2 of the second side surface 210S2 may change depending on objects to be laminated.

Also, when viewed in a plan view or when viewed in a thickness direction of the jig 210, for example, in the third direction DR3, the bottom surface 210B is illustrated as having a quadrangular shape. However, the inventive concept is not limited thereto. The shape of the is bottom surface 210B may also change depending on objects to be laminated. For example, the bottom surface 210B may have various shapes such as a circle, a polygon, and an ellipse, and an amorphous shape.

Figure 7A:
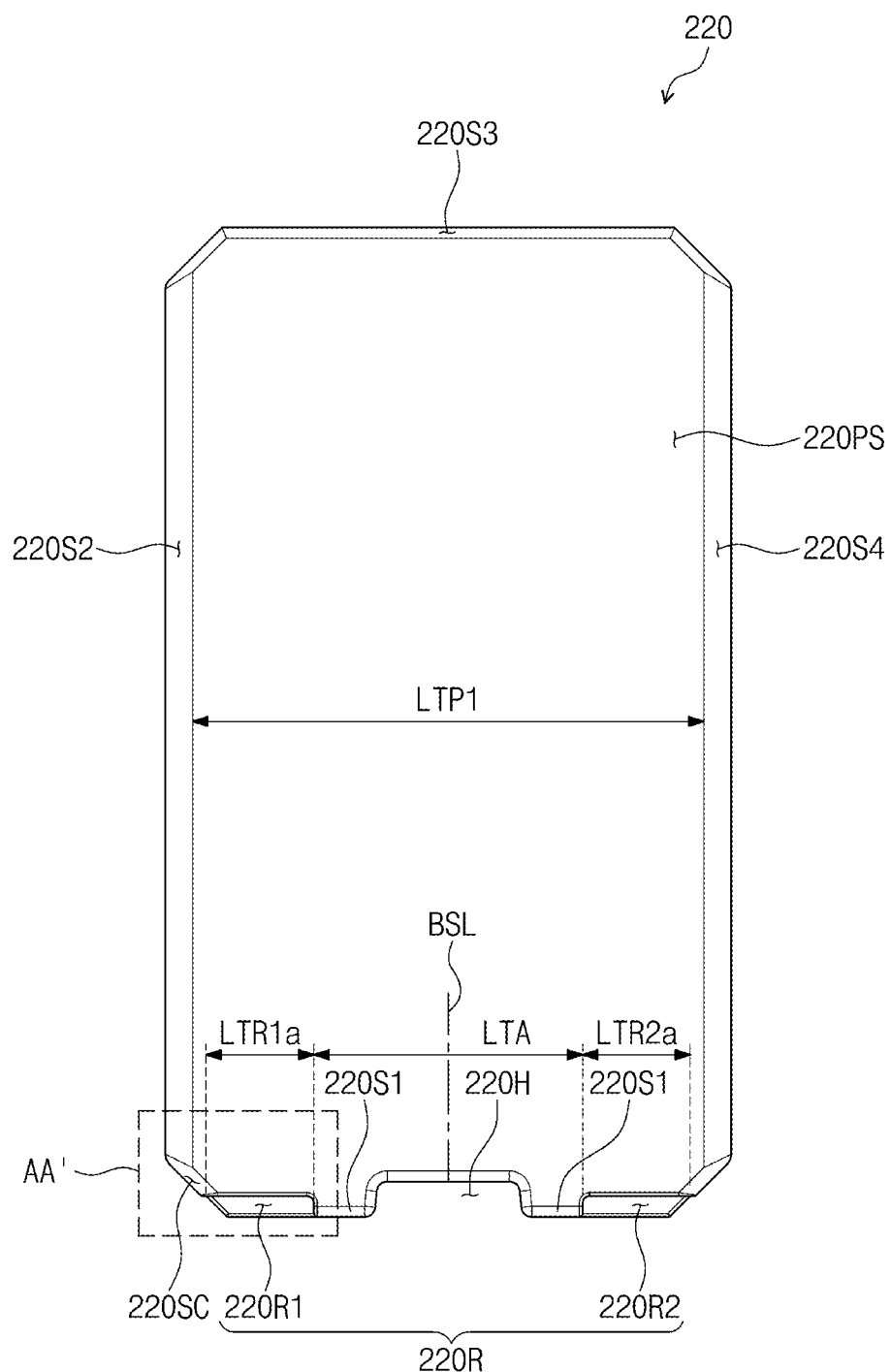
FIG. 7A is a plan view illustrating a pad according to an embodiment of the inventive concept.
Figure 7B:
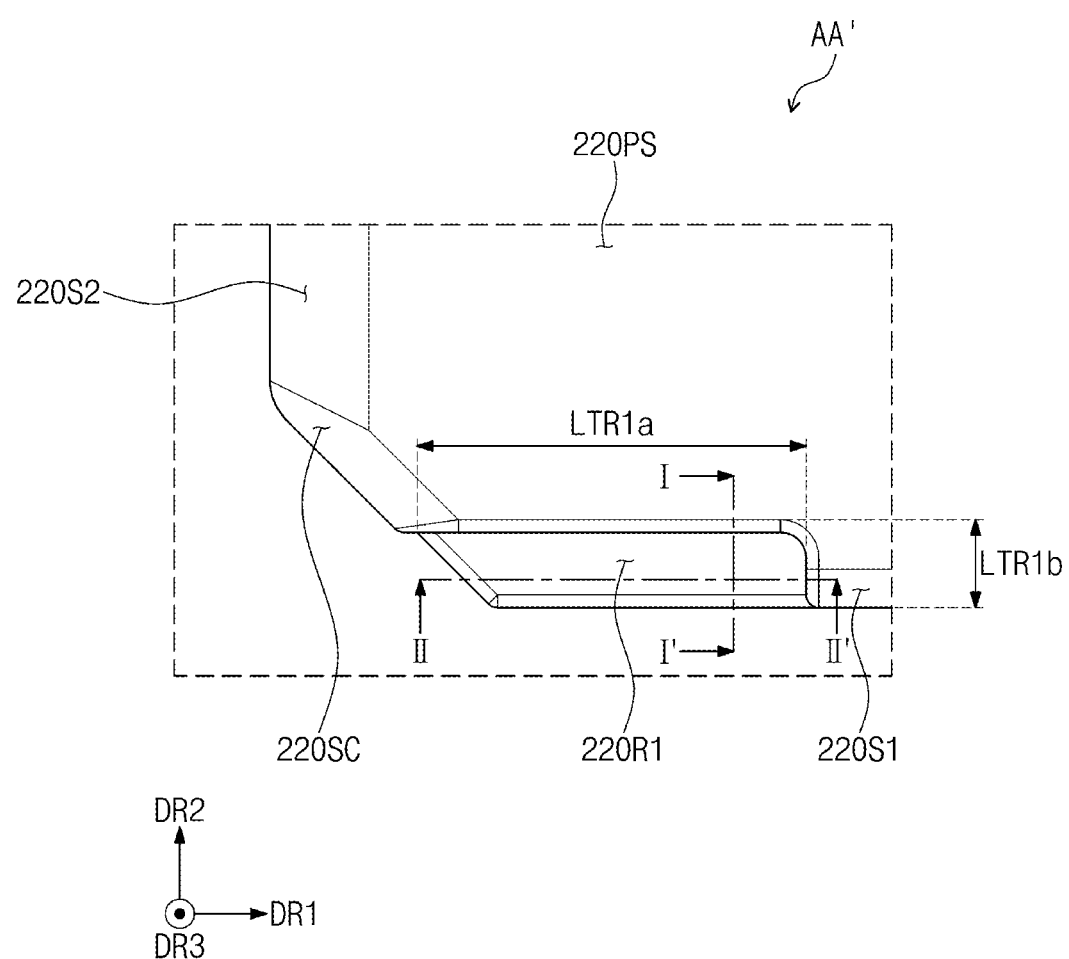
FIG. 7B is an enlarged plan view illustrating AA' of FIG. 7A.

FIG. 7A is a plan view illustrating a pad according to an embodiment of the inventive concept. FIG. 7B is an enlarged plan view illustrating AA' FIG. 7A.

Referring to FIGS. 7A and 7B, a first pad side surface 220S1 and a third pad side surface 220S3 may extend in a first direction DR1, and a second pad side surface 220S2 and a fourth pad side surface 220S4 may extend in a second direction DR2. Each of the first-to-fourth pad side surfaces 220S1, 220S2, 220S3, and 220S4 may have a predetermined curvature. In a pad 220, a connection surface 220SC may be further defined.

The connection surface 220SC may be defined between the pad side surfaces extending in different directions, for example, between the first pad side surface 220S1 and the second pad side surface 220S2, between the first pad side surface 220S1 and the fourth pad side surface 220S4, between the fourth pad side surface 220S4 and the third pad side surface 220S3, or between the second pad side surface 220S2 and the third pad side surface 220S3. The connection surface 220SC may be inclined to the neighboring pad side surfaces of the first-to-fourth pad side surfaces 220S1, 220S2, 220S3, and 220S4. For example, the connection surface 220SC may be defined as a surface extending in a direction between the first direction DR1 and the second direction DR2.

The connection surface 220SC may be an area that presses an area corresponding to a double-curved surface of the display panel 120 (see FIG. 3) when the window 110 (see FIG. 3) and the display panel 120 (see FIG. 3) are laminated. The double-curved surface may be an area in which two side display areas extending in different directions meet each other. The double-curved surface is more likely to have a wrinkled or twisted portion than a single curved surface. For example, when a wrinkled portion of the display panel 120 (see FIG. 3) is strongly pressed, a crack may occur in the display panel 120 (see FIG. 3). According to the inventive concept, as the connection surface 220SC is provided, the pressure applied to the double-curved surface of the display panel 120 (see FIG. 3) may be reduced, and a possibility of the occurrence of a crack in the display panel 120 (see FIG. 3) may be reduced while the display panel 120 (see FIG. 3) and the window 110 are laminated.

A recess 220R may be provided in plurality, and the recess 220R may include a first recess 220R1 and a second recess 220R2. The first recess 220R1 and the second recess 220R2 may be spaced apart from each other with the first pad side surface 220S1 therebetween. In the first pad side surface 220S1, a side surface groove 220H may be further defined. The side surface groove 220H may be defined between the first recess 220R1 and the second recess 220R2 and have a recessed shape.

The side surface groove 220H may be provided so that pressure is not applied to a specific area of a component to be laminated during a lamination process. For example, when the display panel 120 (see FIG. 3) is laminated to the window 110 (see FIG. 3), the side surface groove 220H of the pad 220 may prevent pressure from being applied to an area in which the driving chip 130 (see FIG. 3) is disposed, or reduce pressure to be applied thereto. As a result, a possibility that the driving chip 130 (see FIG. 3) is damaged during the lamination process may be reduced or eliminated.

A sum of a width LTR1$a$ of the first recess 220R1 in the first direction DR1, a width LTR2$a$ of the second recess 220R2 in the first direction DR1, and a distance LTA in the first direction DR1 between the first recess 220R1 and the second recess 220R2 may be equal to or less than a width LTP1 of a pressing surface 220PS in the first direction DR1. Since the first recess 220R1 and the second recess 220R2 are provided being recessed from the first pad side surface 220S1, a length of the first pad side surface 220S1 in the first direction DR1 may be less than the width LTP1 of the pressing surface 220PS in the first direction DR1. The length of the first pad side surface 220S1 in the first direction DR1 may be equal to the distance LTA in the first direction DR1 between the first recess 220R1 and the second recess 220R2.

Referring to FIG. 7B, an enlarged view of the first recess 220R1 is illustrated. The first recess 220R1 may be recessed from the pressing surface 220PS, the connection surface 220SC, and the first pad side surface 220S1.

When viewed in a thickness direction of the pad 220, for example, in a third direction DR3, the width LTR1$a$ of the first recess 220R1 in the first direction DR1 may be greater than a width LTR1$b$ of the first recess 220R1 in the second direction DR2. Each of the widths LTR1$a$ and LTR1$b$ may correspond to a maximum width of a recess bottom surface 220RB (see FIG. 8) of the first recess 220R1 in the first direction DR1 or the second direction DR2.

Referring to FIG. 7A, since the second recess 220R2 has a shape substantially symmetric to the first recess 220R1 with respect to a straight line BSL extending in the second direction DR2, descriptions of the second recess 220R2 will be omitted. In this case, the first recess 220R1 and the second recess 220R2 may have substantially the same size. Here, the same size may represent that the first recess 220R1 and the second recess 220R2 have the same width LTR1$a$ in the first direction DR1 and the same width LTR1$b$ in the second direction DR2. However, the inventive concept is not limited thereto. For example, the second recess 220R2 may have a similar shape with the first recess 220R1 but have a different size from the first recess 220R1. For example, the width LTR2$a$ of the second recess 220R2 in the first direction DR1 may be greater or less than the width LTR1$a$ of the first recess 220R1 in the first direction DR1.

Figure 8:
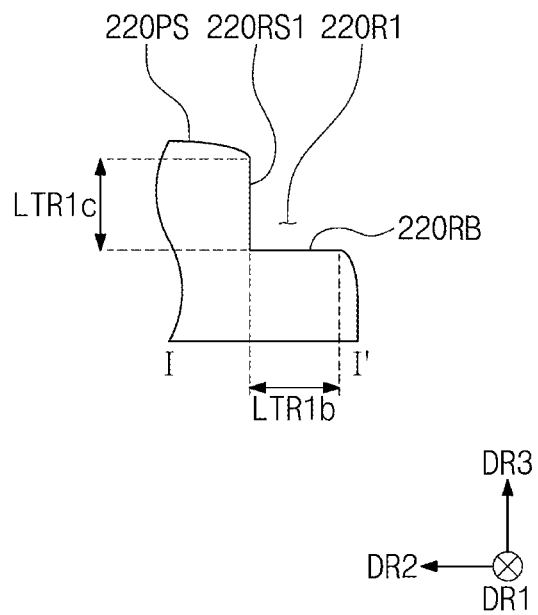
FIG. 8 is a cross-sectional view taken along line I-I' of FIG. 7B.
Figure 9:
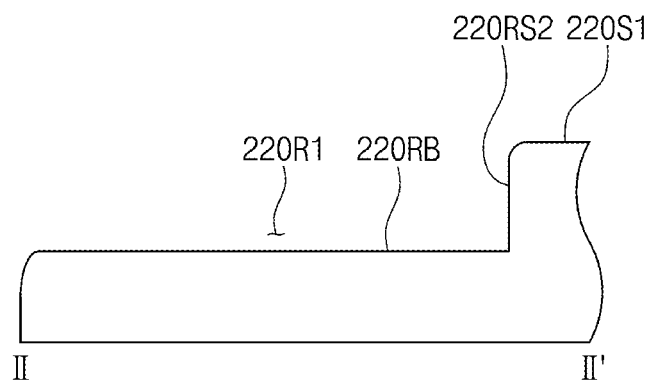
FIG. 9 is a cross-sectional view taken along line II-II' of FIG. 7B.

FIG. 8 is a cross-sectional view taken along line I-I' of FIG. 7B. FIG. 9 is a cross-sectional view taken along line of FIG. 7B.

Referring to FIGS. 8 and 9, the first recess 220R1 may include a recess bottom surface 220RB, a first recess side surface 220161, and a second recess side surface 220162. The first recess 220R1 may be defined by removing a portion of the pad 220 in a thickness direction, for example, in the third direction DR3. Thus, the first recess 220R1 may include the recess bottom surface 220RB.

The first recess side surface 220RS1 may be disposed between the recess bottom surface 220RB and the pressing surface 220PS and connected to the recess bottom surface 220RB and the pressing surface 220PS. The second recess side surface 220RS2 may be disposed between the recess bottom surface 220RB and the first pad side surface 220S1 and connected to the recess bottom surface 220RB and the first pad side surface 220S1.

A portion of the first recess 220R1, facing the first recess side surface 220RS1, may be opened, and a portion of the first recess 220R1, facing the second recess side surface 220RS2, may be opened. That is, the first recess 220R1 may be defined only by the recess bottom surface 220RB, the first recess side surface 220RS1, and the second recess side surface 220RS2.

The width LTR$a$ of the first recess 220R1 in the first direction DR1, the width LTR$b$ of the first recess 220R1 in the second direction DR2, and a height LTR$c$ of the first recess 220R1 in the third direction DR3 may be designed according to objects to be laminated. For example, the width LTR$a$ may be about 10 mm (millimeters), the width LTR$b$ may be about 2 mm, and the height LTR$c$ may be about 3 mm. However, the inventive concept is not limited thereto.

FIGS. 10A to 10D are views illustrating a method for manufacturing a display device according to an embodiment of the inventive concept.

Referring to FIG. 10A, a window 110 is fixed to a jig 210. The window 110 may be placed within an accommodation groove 210RH of the jig 210. A portion of the accommodation groove 210RH may have a shape conforming to that of the window 110.

A guide film 300 may be attached to a bottom surface of a display panel 120, and an adhesive layer 150 may be attached to a top surface of the display panel 120. FIG. 10A illustrates as an example that the adhesive layer 150 is applied on the top surface of the display panel 120, but the inventive concept is not limited thereto. For example, the adhesive layer 150 may be applied on a bottom surface of the window 110. All of the guide film 300 and the adhesive layer 150 may be attached to the first portion 121 (see FIG. 3) of the display panel 120.

The display panel 120 is fixed to clamps 240. For example, the guide film 300 may be clamped to the clamps 240. That is, the display panel 120 may not be directly clamped to the clamps 240, but may be indirectly clamped to the clamps 240 through the guide film 300. Thus, the display panel 120 may be not damaged due to a clamping operation of the clamps 240.

Figure 10B:
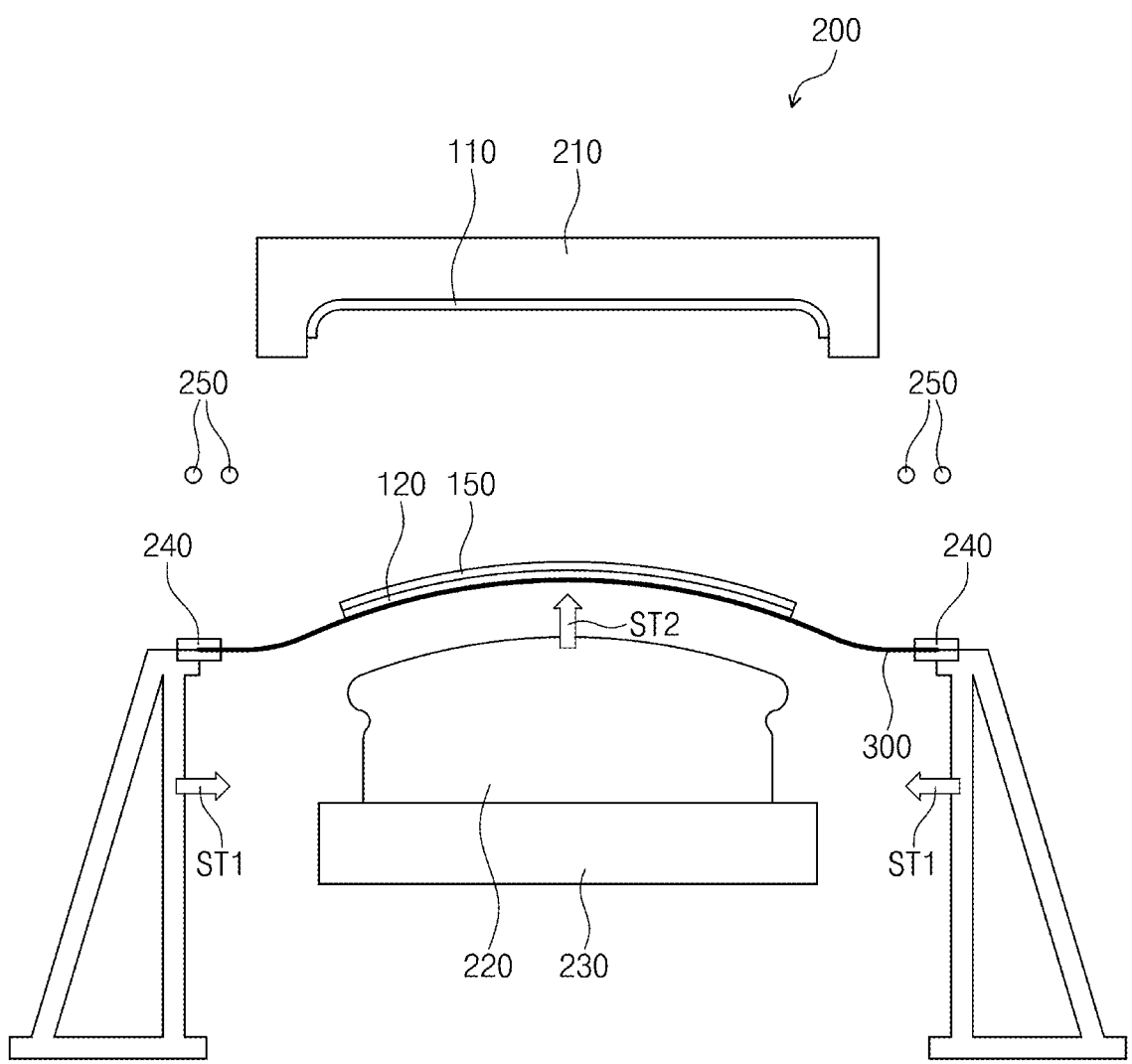
Figure 10B:
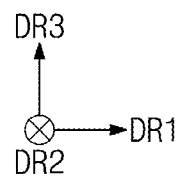

Referring to FIG. 10B, the clamps 240 may be moved in directions ST1 of approaching each other. Thus, the guide film 300, the display panel 120, and the adhesive layer 150 may be firstly bent. The directions ST1 of approaching each other may be parallel to the first direction DR1, and the display panel 120 may be bent with respect to the first direction DR1. For example, the first portion 121 (see FIG. 3) of the display panel 120 may be bent with respect to the first direction DR1.

After the display panel 120 is firstly bent, a pad 220 and a lower jig 230 may be moved in a direction ST2 toward the jig 210. The direction ST2 toward the jig 210 may be parallel to the third direction DR3.

Figure 10C:
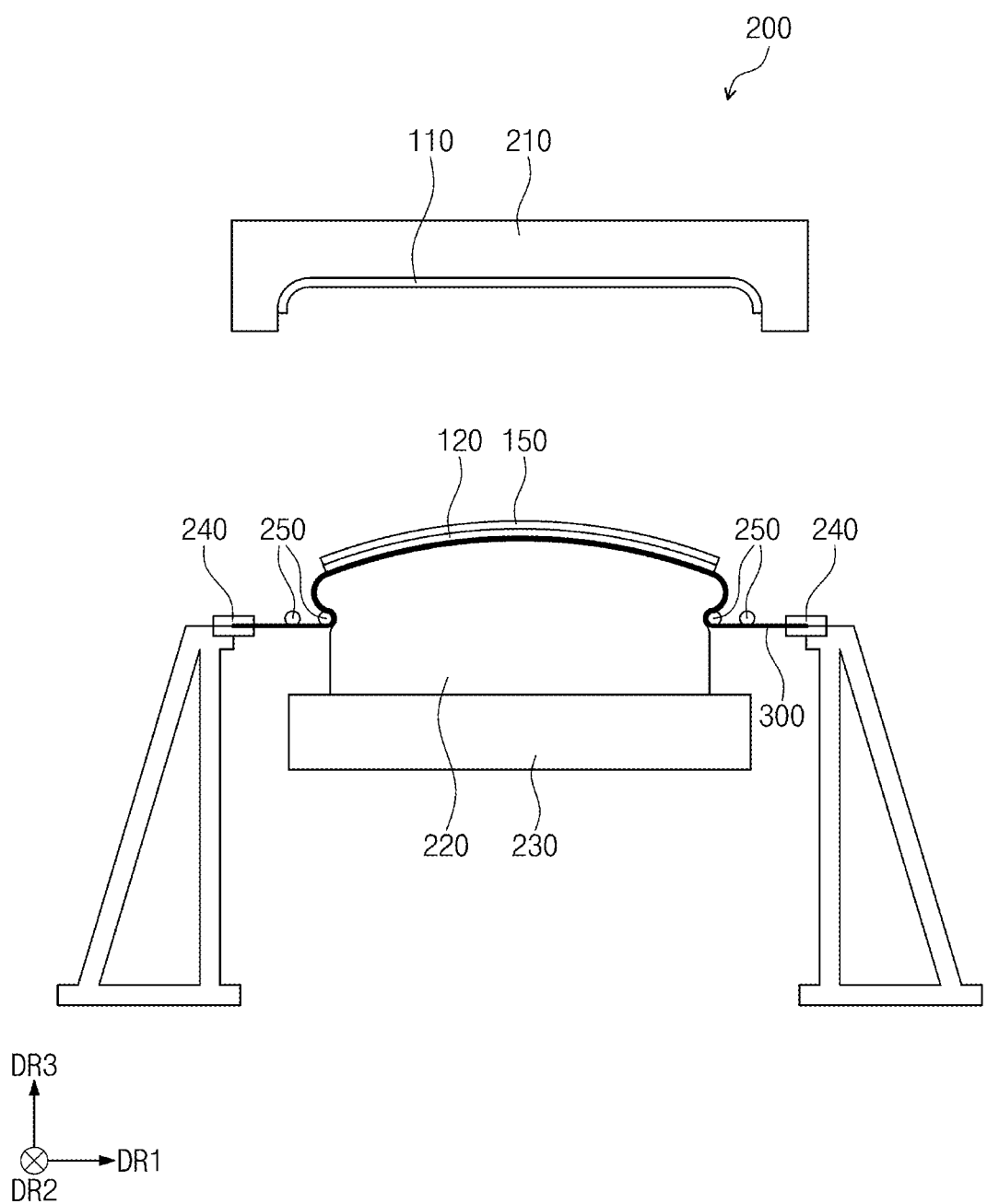

Referring to FIG. 10C, the guide film 300 comes into contact with the pad 220, and the pad 220 presses the guide film 300, the display panel 120, and the adhesive layer 150 in the third direction DR3. Accordingly, shapes of the guide film 300, the display panel 120, and the adhesive layer 150 may be deformed conforming to a shape of the pad 220. Subsequently, the guide film 300 is fixed to the pad 220 by using the first pressing part 250.

Figure 10D:
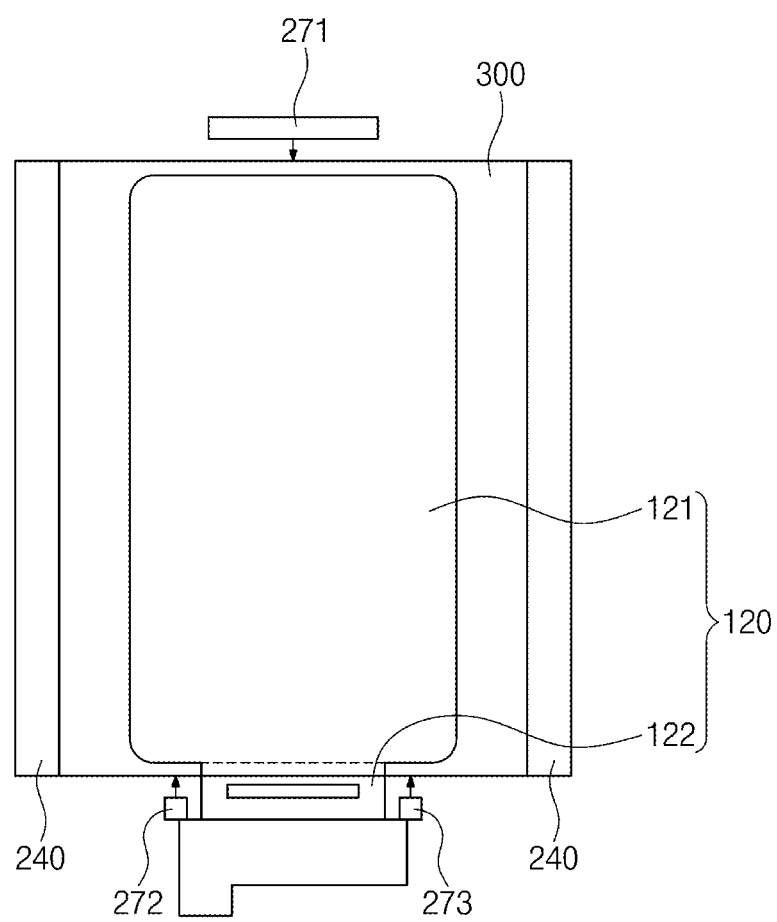

Referring to FIG. 10D, the second pressing part 270 (see FIG. 5B) may include a first sub-pressing part 271, a second sub-pressing part 272, and a third sub-pressing part 273. The first-to-third sub-pressing parts 271, 272, and 273 press the display panel 120 in the second direction DR2, and thus, the display panel 120 may be bent with respect to the second direction DR2. The first portion of the display panel 120 may be secondly bent by the first-to-third sub-pressing parts 271, 272, and 273.

Referring to FIG. 10C again, the pad 220 and the lower jig 230 may press the display panel 120 in a direction toward the jig 210 so that the display panel 120 is laminated with the window 110.

Figure 11:
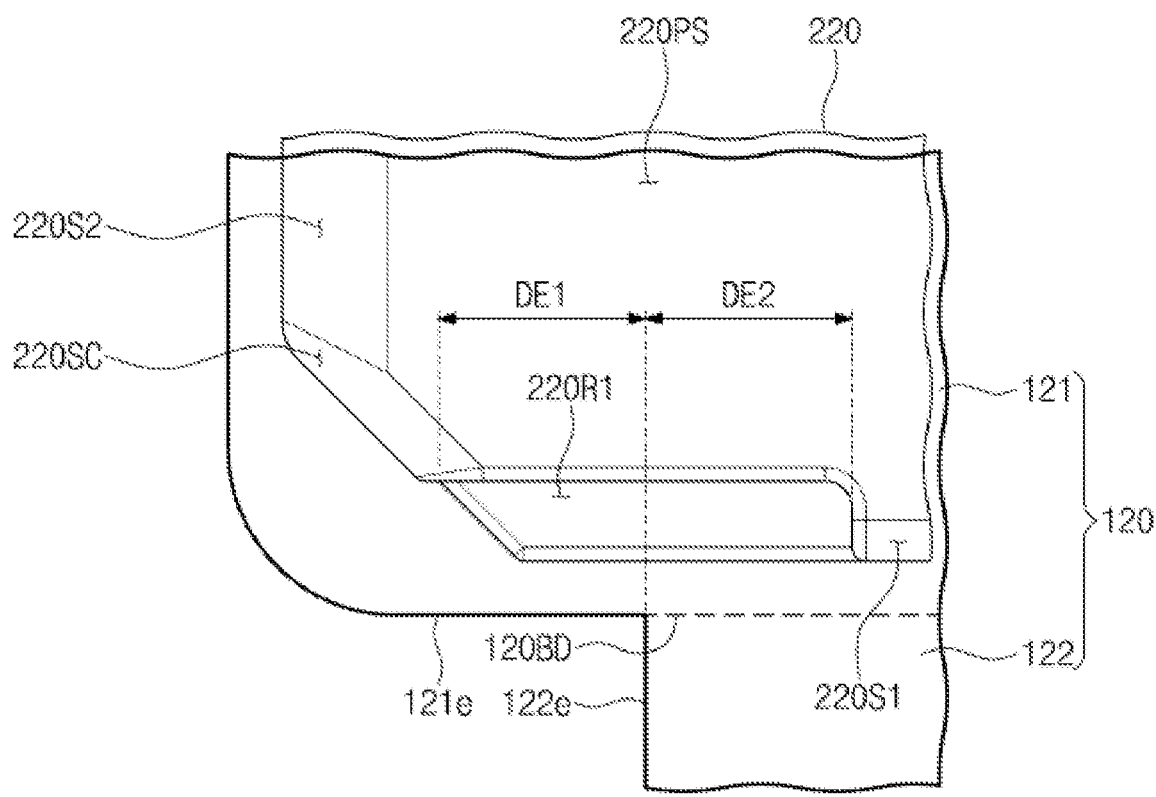
FIG. 11 is a view illustrating a display panel according to an embodiment of the inventive concept.
Figure 11:
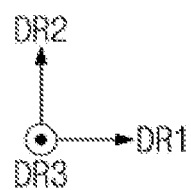

FIG. 11 is a view illustrating a pad and a display panel according to an embodiment of the inventive concept.

Referring to FIG. 11, in order to describe an alignment state of a display panel 120 and a pad 220, the display panel 120 and the pad 220 are illustrated.

Referring to FIGS. 10A to 10D and FIG. 11, the pad 220 may be disposed below a first portion 121 of the display panel 120. A first recess 220R1 (or a recess) of the pad 220 may be aligned adjacent to a boundary 120BD between the first portion 121 and a second portion 122.

Each of first and second distances DE1 and DE2 between an edge 122e of the second portion 122 and edges of the first recess 220R1 may be equal to or greater than a predetermined value. Each of first and second distances DE1 and DE2 may be a distance in a direction parallel to a first direction DR1. Each of first and second distances DE1 and DE2 may be equal to or greater than about 5 mm. However, this is merely an example, and each of first and second distances DE1 and DE2 is not limited to the above value.

A length of the boundary 120BD between the first portion 121 and the second portion 122 in the first direction DR1 may be greater than a length of a first pad side surface 220S1 in the first direction DR1. Thus, when viewed in a second direction DR2, the edge 122e of the second portion 122 may overlap the first recess 220R1 and the second recess 220R2 (see FIG. 7A).

While the display panel 120 is laminated to the window 110, pressure may be applied to the display panel 120. The first side display area 120AS1 (see FIG. 3) of the display panel 120 and the first side transmission surface 110AS1 (see FIG. 3) of the window 110 may be pressed and laminated to each other by the curved first pad side surface 220S1 of the pad 220. That is, sufficient pressure may be applied to the first side display area 120AS1 (see FIG. 3) of the display panel 120 and the first side transmission surface 110AS1 (see FIG. 3) of the window 110 by the curved first pad side surface 220S1.

The second portion 122 adjacent to the first side display area 120AS1 (see FIG. 3) may have a width less than that of the first portion 121. A portion where an edge 121e of the first portion 121 is connected to the edge 122e of the second portion 122 may be susceptible to stress. According to the inventive concept, the first recess 220R1 and the second recess 220R2 (see FIG. 7A) may be provided adjacent to the boundary 120BD between the first portion 121 and the second portion 122.

A predetermined space is secured between the display panel 120 and the pad 220 by the first recess 220R1. Thus, even though the pad 220 presses the display panel 120, pressure applied to a portion in which the first recess 220R1 is defined may be lower than pressure applied to a portion in which the first recess 220R1 is not defined. Thus, the stress applied to a region adjacent to the boundary 120BD between the first portion 121 and the second portion 122 may be reduced by the first recess 220R1. As a result, when the display panel 120 and the window 110 are laminated, the possibility of the occurrence of the crack in the display panel 120 may be reduced, and the lamination process yield may be improved.

Figure 12:
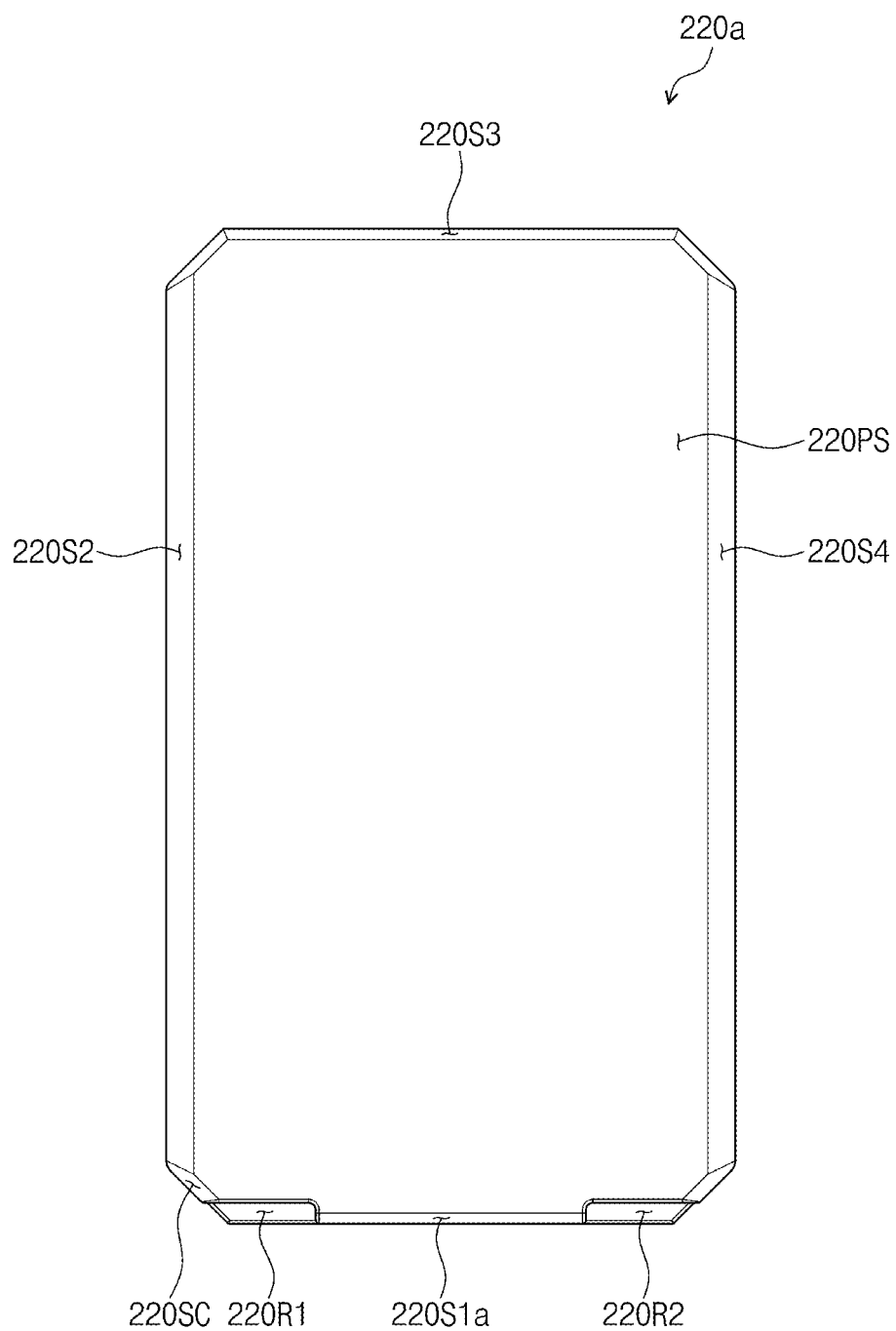
FIG. 12 is a plan view illustrating a pad according to an embodiment of the inventive concept.
Figure 12:
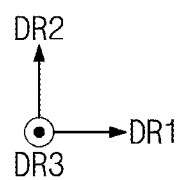

FIG. 12 is a plan view illustrating a pad according to an embodiment of the inventive concept.

Referring to FIG. 12, the plan view of a pad 220a is illustrated. Compared to the pad 220 illustrated in FIG. 7A, the pad 220a may have a structure in which the side surface groove 220H is removed.

In the pad 220a, a first recess 220R1 and a second recess 220R2 may be defined. The first recess 220R1 and the second recess 220R2 may be spaced apart from each other with a first pad side surface 220S1a therebetween.

The first recess 220R1 may be defined to be recessed from a pressing surface 220PS, the first pad side surface 220S1a, and a connection surface 220SC, and the second recess 220R2 may be defined to be recessed from the pressing surface 220PS, the first pad side surface 220S1a, and a connection surface 220SC between the first pad side surface 220S1a and the fourth pad side surface 220S4.

The pressure applied to the portion of the display panel 120 (see FIG. 3), susceptible to stress, may be reduced by the first recess 220R1 and the second recess 220R2, and as a result, the possibility that the display panel 120 (see FIG. 3) is damaged during the lamination process may be reduced.

Figure 13:
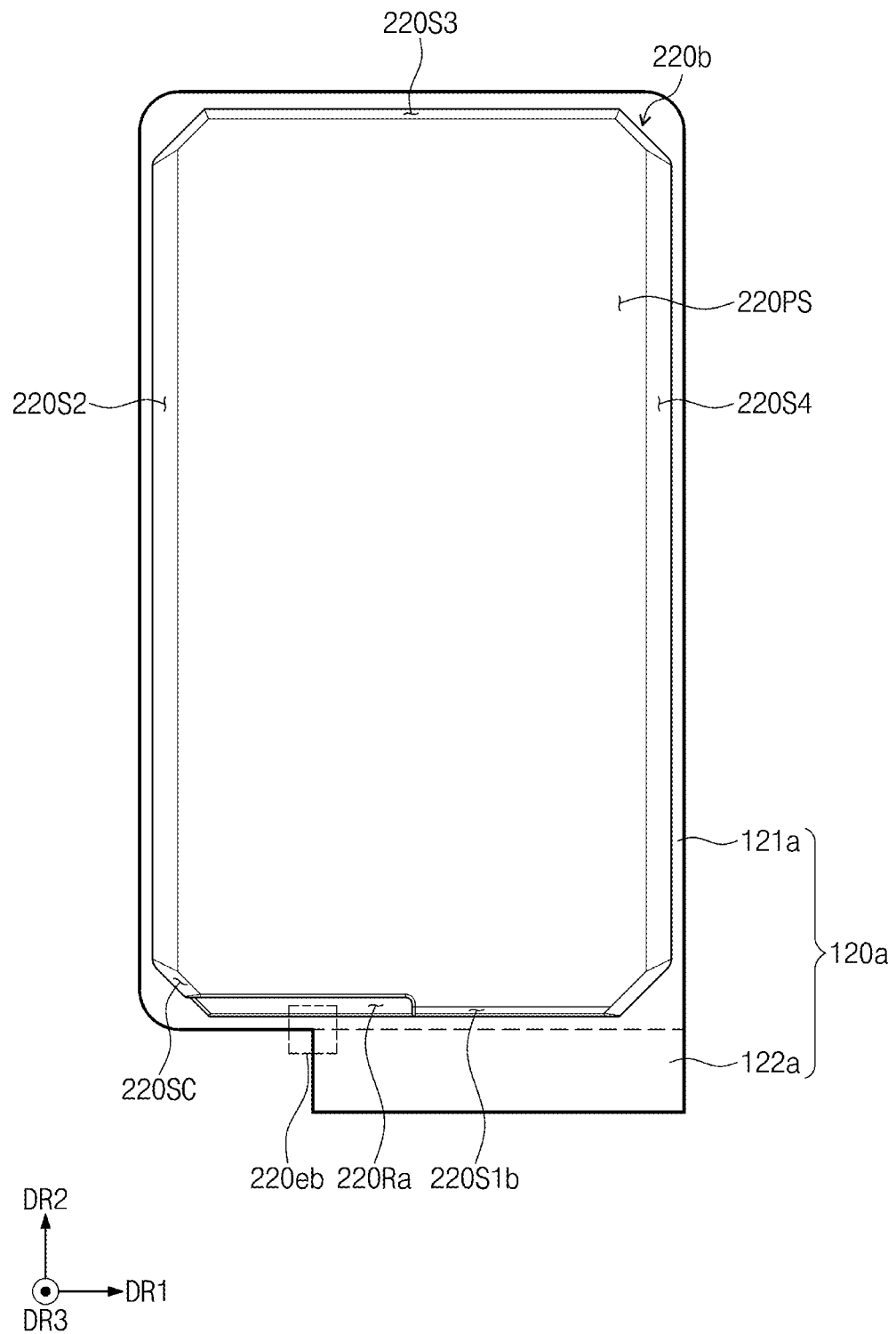
FIG. 13 is a view illustrating a pad and a display panel according to an embodiment of the inventive concept.

FIG. 13 is a view illustrating a pad and a display panel according to an embodiment of the inventive concept.

Referring to FIG. 13, a pad 220b and a display panel 120a are illustrated. A shape of the display panel 120a may differ from a shape of the display panel 120 described above with reference to FIG. 3. For example, the display panel 120a may include a first portion 121a and a second portion 122a. The second portion 122a may have a shape aligned to one side of the first portion 121a.

One recess 220Ra may be defined in the pad 220b. The one recess 220Ra may be recessed from a pressing surface 220PS, a connection surface 220SC, and a first pad side surface 220S1b.

The display panel 120a and the pad 220b may be aligned so that the recess 220Ra of the pad 220b is adjacent to a curved edge portion 220eb between the first portion 121a and the second portion 122a.

Stress applied to the edge portion 220eb may be reduced by the recess 220Ra. As a result, when the display panel 120a is laminated to the window 110 (see FIG. 3), the possibility of the occurrence of the crack in the display panel 120a may be reduced, and the lamination process yield may be improved.

Figure 14:
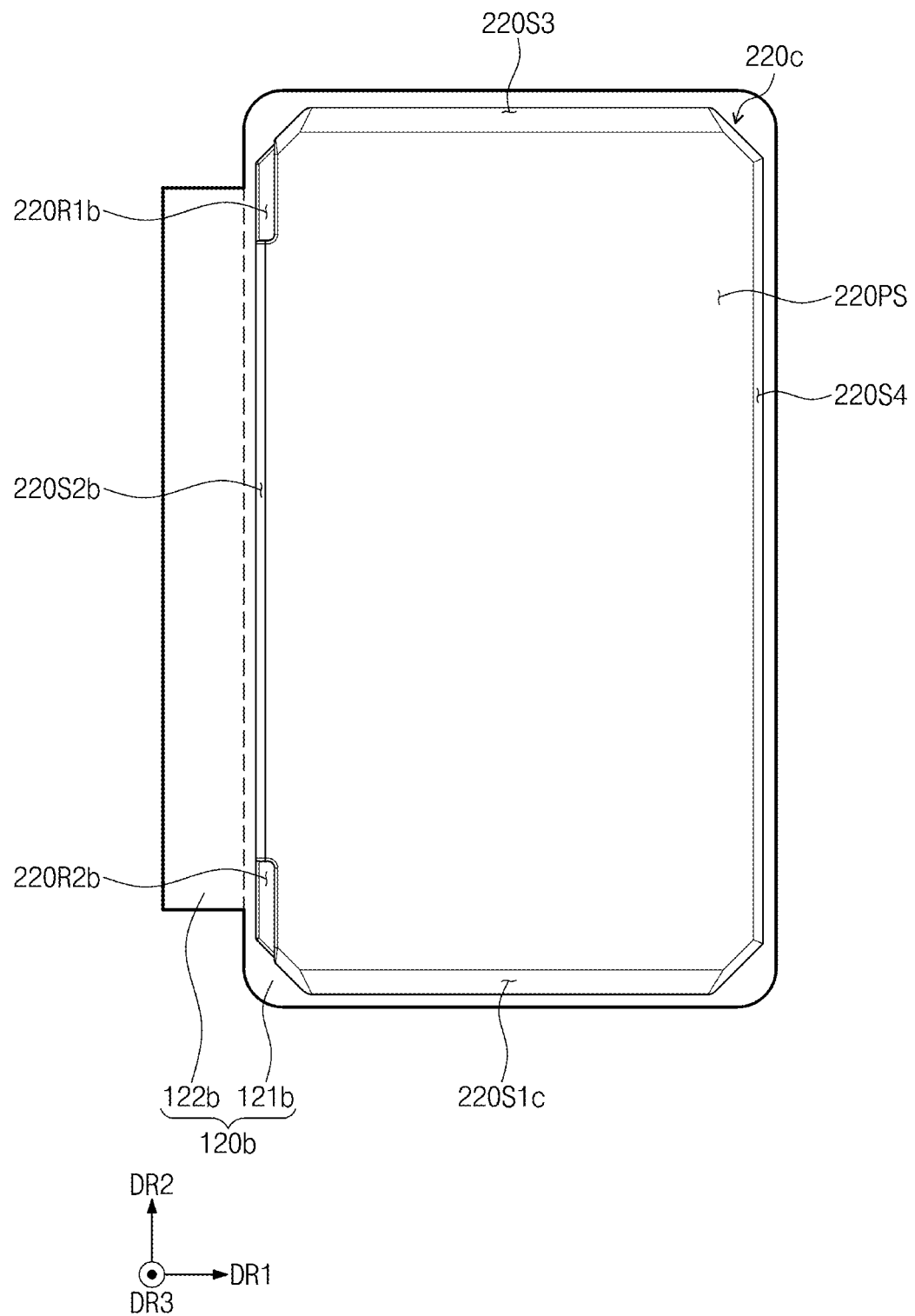
FIG. 14 is a view illustrating a pad and a display panel according to an embodiment of the inventive concept.

FIG. 14 is a view illustrating a pad and a display panel according to an embodiment of the inventive concept.

Referring to FIG. 14, a pad 220c and a display panel 120b are illustrated. A shape of the display panel 120b may differ from a shape of the display panel 120 described above with reference to FIG. 3. For example, the display panel 120b may include a first portion 121b and a second portion 122b. The second portion 122b may have a shape extending from a long side of the first portion 121b.

In the pad 220c, a first recess 220R1b and a second recess 220R2b may be defined. Each of the first recess 220R1b and the second recess 220R2b may be recessed from a pressing surface 220PS and a second pad side surface 220S2b. In the embodiment described above, the recess is defined on a short side of the pressing surface 220PS. On the other hand, in FIG. 14, the first recess 220R1b and the second recess 220R2b may be defined on the long side of the pressing surface 220PS.

It is illustrated as an example that a recess is not defined on a first pad side surface 220S1c, but the embodiment of the inventive concept is not limited thereto. For example, as illustrated in FIG. 7A, at least one of the first recess 220R1 (see FIG. 7A) or the second recess 220R2 (see FIG. 7A) may also be additionally defined even on the first pad side surface 220S1c of the pad 220c. Also, a recess may also be additionally defined even on at least one of a third pad side surface 220S3 and a fourth pad side surface 220S4.

As described above, a recess may be defined in the pad by which the display panel and the window are laminated. The predetermined space may be secured between the display panel and the pad by the recess. Thus, although the pad applies pressure to the display panel, the pressure applied to the portion in which the recess is defined may be less than the pressure applied to the portion in which the recess is not defined. Therefore, the stress due to the pressure applied to the area adjacent to the boundary in which the widths of the display panel are different may be reduced by the recess. As a result, when the display panel and the window are laminated, the possibility of the occurrence of the crack in the display panel may be reduced, and the lamination process yield may be improved.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lamination apparatus comprising:
a jig comprising an accommodation groove which is defined by a bottom surface, a first side surface bent and extending from the bottom surface, and a second side surface bent and extending from the bottom surface; and
a pad facing the jig,
wherein the pad comprises a pressing surface facing the bottom surface, a first pad side surface bent from the pressing surface in a direction away from the jig, a second pad side surface bent from the pressing surface in a direction away from the jig, a connection surface connecting the first pad side surface to the second pad side surface, and a recess recessed from the pressing surface, the connection surface, and the first pad side surface.

2. The lamination apparatus of claim 1, wherein:
the first side surface and the first pad side surface extend in a first direction; and
the second side surface and the second pad side surface extend in a second direction crossing the first direction.

3. The lamination apparatus of claim 2, wherein, when viewed in a thickness direction of the pad, a width of the recess in the first direction is greater than a width of the recess in the second direction.

4. The lamination apparatus of claim 2, wherein a length of the first side surface in the first direction is less than a length of the second side surface in the second direction.

5. The lamination apparatus of claim 2, wherein a height of the first side surface is less than a height of the second side surface.

6. The lamination apparatus of claim 5, further comprising a shape control part disposed adjacent to the first pad side surface of the pad, wherein the shape control part has a shape extending in the first direction.

7. The lamination apparatus of claim 6, wherein the shape control part is more rigid than the pad.

8. The lamination apparatus of claim 2, wherein:
the recess comprises a recess bottom surface, a first recess side surface connected to the recess bottom surface and the pressing surface, and a second recess side surface connected to the recess bottom surface and the first pad side surface; and
a portion facing the first recess side surface and a portion facing the second recess side surface in the recess are opened.

9. The lamination apparatus of claim 2, wherein:
the recess comprises a first recess and a second recess; and
the first recess and the second recess are recessed from the pressing surface and the first pad side surface, and the first recess and the second recess are spaced apart from each other in the first direction with the first pad side surface therebetween.

10. The lamination apparatus of claim 9, wherein the first recess and the second recess have shapes symmetric to each other with respect to a symmetry line extending in the second direction.

11. The lamination apparatus of claim 9, wherein a sum of a distance between the first recess and the second recess, a width of the first recess in the first direction, and a width of the second recess in the first direction is equal to or greater than a width of the pressing surface in the first direction.

12. A method for manufacturing a display device, the method comprising:
fixing a window to a jig which has an accommodation groove;
fixing a display panel to a clamp, the display panel comprising a first portion having a first width parallel to a first direction and a second portion having a second width less than the first width and parallel to the first direction; and
pressing the first portion of the display panel toward the window by using a pad which comprises a pressing surface, a first pad side surface bent from the pressing surface in a direction away from the jig, a second pad side surface bent from the pressing surface in a direction away from the jig, and a recess recessed from the pressing surface and the first pad side surface, wherein the display panel is aligned so that the recess of the pad is adjacent to a boundary between the first portion and the second portion.

13. The method of claim 12, further comprising:
bending the display panel with respect to the first direction by using the clamp;
bringing the first portion of the display panel into contact with the pad, after the bending of the display panel; and
bending the first portion of the display panel with respect to a second direction crossing the first direction, after the bringing of the display panel into contact with the pad.

14. The method of claim 12, wherein:
the window comprises a main transmission surface and side transmission surfaces bent and extending from the main transmission surface; and
the first portion of the display panel is attached to the main transmission surface and the side transmission surfaces.

15. The method of claim 12, wherein a length of the boundary between the first portion and the second portion is greater than a length of the first pad side surface in the first direction.

16. The method of claim 12, wherein:
the recess comprises a recess bottom surface, a first recess side surface connected to the recess bottom surface and the pressing surface, and a second recess side surface connected to the recess bottom surface and the first pad side surface; and
a portion facing the first recess side surface and a portion facing the second recess side surface in the recess are opened.

17. The method of claim 12, wherein a width of the pressing surface in the first direction is greater than a length of the first pad side surface in the first direction.

18. A lamination apparatus comprising:
a jig comprising an accommodation groove which is defined by a bottom surface and first, second, third, and fourth side surfaces that are bent and extend from the bottom surface; and
a pad comprising a pressing surface, which faces the bottom surface, and first, second, third, and fourth pad side surfaces that extend from the pressing surface,
wherein a recess is defined in a portion in which the first pad side surface and the pressing surface of the pad meet each other, and the first pad side surface has a predetermined curvature.

19. The lamination apparatus of claim 18, wherein:
the recess comprises a first recess and a second recess; and
the first recess and the second recess are spaced apart from each other in a first direction with the first pad side surface therebetween.

20. The lamination apparatus of claim 18, wherein:
the recess comprises a recess bottom surface, a first recess side surface connected to the recess bottom surface and the pressing surface, and a second recess side surface connected to the recess bottom surface and the first pad side surface; and
a portion facing the first recess side surface and a portion facing the second recess side surface in the recess are opened.

* * * * *

UNITED STATES PATENT AND TRADEMARK OFFICE
CERTIFICATE OF CORRECTION

PATENT NO. : 11,654,670 B2
APPLICATION NO. : 17/135200
DATED : May 23, 2023
INVENTOR(S) : Youngkwan Kim et al.

Page 1 of 1

It is certified that error appears in the above-identified patent and that said Letters Patent is hereby corrected as shown below:

In the Claims

In Column 16, Line 50, delete "greater" and insert --less--.

Signed and Sealed this
First Day of October, 2024

Katherine Kelly Vidal
Director of the United States Patent and Trademark Office